US008488165B2

(12) United States Patent
DeRoller

(10) Patent No.: US 8,488,165 B2
(45) Date of Patent: Jul. 16, 2013

(54) SYSTEM AND METHOD FOR CORRELATING ATTEMPTED RENDERING JOB WITH ACTUAL RENDERING JOB

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 518 days.

(21) Appl. No.: 12/876,369

(22) Filed: Sep. 7, 2010

(65) Prior Publication Data

US 2012/0057190 A1   Mar. 8, 2012

(51) Int. Cl.
  *G06F 3/12* (2006.01)
  *G06F 11/00* (2006.01)
  *G06K 15/00* (2006.01)
  *G06Q 10/00* (2012.01)
  *G06Q 30/00* (2012.01)

(52) U.S. Cl.
  USPC ......... 358/1.15; 358/1.1; 358/1.13; 358/1.14; 358/1.16; 705/7.35; 714/47.3

(58) Field of Classification Search
  None
  See application file for complete search history.

(56) References Cited

U.S. PATENT DOCUMENTS

| 5,337,258 A * | 8/1994 | Dennis .......................... 714/47.3 |
| 8,108,247 B2 * | 1/2012 | Klassen ........................ 705/7.35 |
| 2010/0110469 A1 * | 5/2010 | Chakraborty et al. ....... 358/1.14 |

* cited by examiner

*Primary Examiner* — Satwant Singh
(74) *Attorney, Agent, or Firm* — Kermit D. Lopez; Luis M. Ortiz; Ortiz & Lopez, PLLC

(57) ABSTRACT

An automated system and method for correlating an attempted rendering job with an actual rendering job. A print governance application can be configured with a set of predefined rendering rules in order to manage a rendering job behavior. A rendering policy log data and a rendering job tracking data can be retrieved from a database associated with the print governance application. The policy log data and the job tracking data can be correlated in order to retrieve matched records based on a predefined criterion utilizing a correlation algorithm. A report can be visually generated by analyzing the matched records in order to determine impact of print governance in an enterprise environment.

20 Claims, 7 Drawing Sheets

| DATE | DOCUMENT | USER NAME | PRINTER | ACTION | COLOR | SIDES | PRINT POLICY RULE |
|---|---|---|---|---|---|---|---|
| 3/25/2010 7:38 | 15308E3E660A 45.pdf | XDE3GTOD \tsmith | N8_WCP 255 | Printed | Black | 2 Sided | Warning - Document Over 99 impressions |
| 3/25/2010 7:48 | Microsoft Office Outlook - Memo Style | XDE3GTOD \mderoller | N8_WCP 3545 | Cancelled | Color | 2 Sided | Reject - color - Emails (MS outlook) |
| 3/25/2010 7:59 | 89137_Suppliers - Test Matrix-SupplyOrderChanges.xlsx | XDE3GTOD \btomas | N8_WCP 255 | Cancelled | Black | 1 Sided | Reject - Simplex Job (Greater than 10 Pages) |
| 3/25/2010 9:44 | Regexch09.pdf | XDE3GTOD \aranch | N8_WCP 3545 | Printed/ Modified | Color | 1 Sided | Reject - Simplex Job (Greater than 10 Pages) |

FIG. 5

| JOB COMPLETION TIME | OWNER USER | DOCUMENT NAME | QUEUE NAME | COLOR PRINT | COLOR PAGE COUNT | B&W PAGES | DUPLEX PRINT |
|---|---|---|---|---|---|---|---|
| 3/25/2010 7:37 | XDE3GTOD\ tsmith | 15308E3E8084 5.PDF | N8_WCP_255 | No | 0 | 144 | Yes |
| 3/25/2010 7:49 | XDE3GTOD\ mderoller | Microsoft Office Outlook - Memo Style | N8_WCP_3545 | No | 0 | 2 | Yes |
| 3/25/2010 7:49 | XDE3GTOD\ mderoller | -XCM usability test 1_test plan_ver1 013.docx | N8_WCP_255 | No | 0 | 6 | No |
| 3/25/2010 7:50 | XDE3GTOD\ mderoller | Microsoft Office Outlook - Memo Style | N8_WCP_255 | No | 0 | 2 | Yes |
| 3/25/2010 7:54 | XDE3GTOD\ btomas | Microsoft PowerPoint GCSF250310 | N8_WCP_3545 | Yes | 8 | 0 | Yes |
| 3/25/2010 7:59 | XDE3GTOD\ btomas | 89137_supplier s test Matrix.xlsx | N8_WCP_3545 | No | 0 | 10 | Yes |
| 3/25/2010 8:00 | XDE3GTOD\ btomas | 89137_supplier s test Matrix.xlsx | N8_WCP_3545 | No | 0 | 4 | Yes |

FIG. 6

SYSTEM AND METHOD FOR CORRELATING ATTEMPTED RENDERING JOB WITH ACTUAL RENDERING JOB

TECHNICAL FILED

Embodiments are generally related to rendering devices such as, for example, printers, scanners, photocopy machines, multi-function devices and the like. Embodiments are also related to correlation computing techniques. Embodiments are additionally related to systems and methods for correlating rendering jobs.

BACKGROUND OF THE INVENTION

Networked rendering devices can interact with an assemblage of other rendering devices, client devices, servers, and other components that are connected to and communicate over a network. One example of a rendering device is an MFD (Multi-Function Device), which includes the functionality of multiple rendering devices such as printers, scanners, faxes, copy machines, and so forth. Such networked rendering devices can be communicatively linked with a client device in order to provide various operations such as, for example, printing, scanning, and other operations within the network. A client device such as, for example, personal computer, desktop computer and/or a handheld computing device permits a user to submit a rendering document to a networked rendering device.

With the proliferation of color rendering devices, a managed rendering service provider deploys an output management solution for governing the use of rendering documents with respect to a customer. Deploying output management solution to a large-scale enterprise environment requires diligence and skill on the part of an administrator for configuring and monitoring such tools. Additionally, such output management solutions must be managed correctly when deployed as part of a managed services agreement in order to ensure cost effective print governance. A majority of prior art output management solutions generally utilize a set of rules to control printing and to meet the cost savings promised in the services agreement. Such prior art approaches however lack the ability to prove the financial impact of the print governance with respect to the rendering behavior.

Based on the foregoing, it is believed that a need therefore exists for an improved system and method for correlating an attempted rendering job with an actual rendering job in order to determine impact of print governance in an enterprise environment, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a networked rendering device such as, for example, a printer, scanner, photocopy machine, fax machine, and/or an MFD.

It is another aspect of the disclosed embodiments to provide for an improved system and method for correlating an attempted rendering job with an actual rendering job.

It is a further aspect of the disclosed embodiments to provide for an improved data correlation algorithm in order to determine impact of print governance in an enterprise environment.

The aforementioned aspects and other objectives and advantages can now be achieved as described herein. An automated system and method for correlating an attempted rendering job with an actual rendering job, is disclosed herein. A print governance application can be configured with a set of predefined rendering rules in order to manage a rendering job behavior. A rendering policy log data and a rendering job tracking data can be retrieved from a database associated with the print governance application. The policy log data and the job tracking data can be correlated in order to retrieve matched records based on a predefined criterion utilizing a correlation algorithm. A report can be visually generated by analyzing the matched records in order to determine impact of print governance in an enterprise environment.

The rendering jobs rejected (e.g. attempted rendering jobs) based on the rendering rules can be recorded as the policy log data. The rendering jobs submitted based on the rendering rules (e.g. actual rendering jobs) can be recorded as the rendering job tracking data. The policy log data and the rendering job tracking data can be correlated based on the predefined criteria in order to retrieve the matched records. The matched records can then be compared to estimate financial impact with respect to the rendering rules. The reports can be generated based on the matched records to indicate an estimated cost reduction. Such system and method can automatically and efficiently indicate the financial impact of print governance at the rule level.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 5 illustrates a tabular view of a policy log data, in accordance with the disclosed embodiments;

FIG. 6 illustrates a tabular view of a rendering job tracking data, in accordance with the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
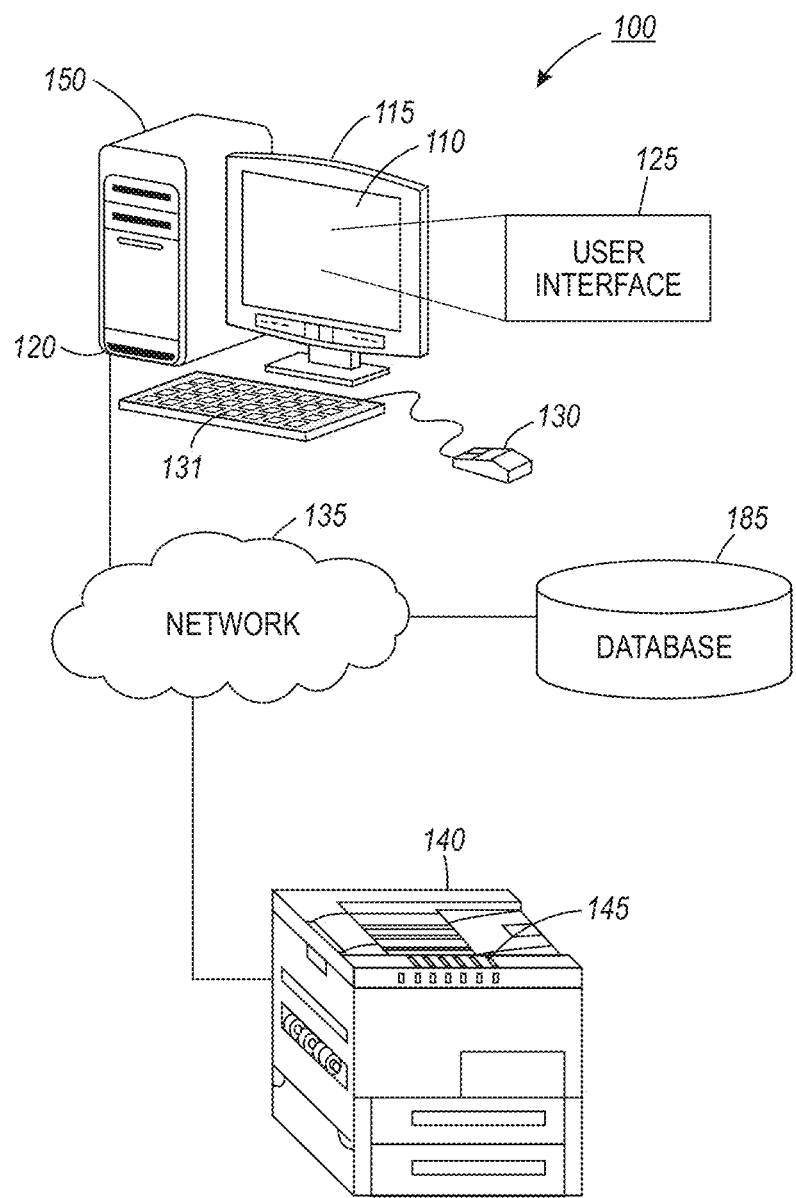
FIG. 1 illustrates an example of a rendering device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a rendering device 140 coupled to a data-processing apparatus 110 through a network 135. In some embodiments, rendering device 140 may be a rendering device such as a printer, scanner, copy machine, etc. In other embodiments, rendering device 140 may be an MFD. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140 may be included in association with the data-processing apparatus 110 as desired.

Figure 2:
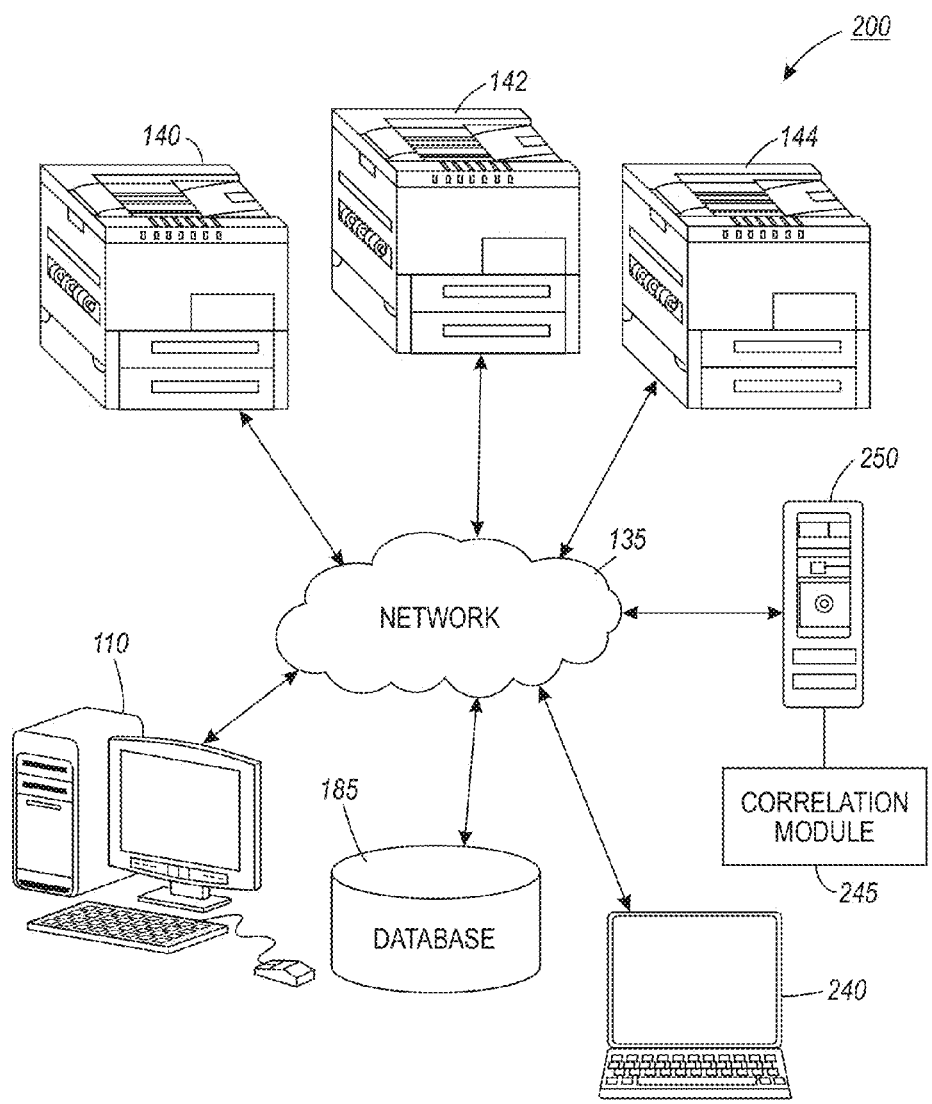
FIG. 2 illustrates a graphical representation of an output management system associated with a network, in accordance with the disclosed embodiments.

Note that as utilized herein, the term rendering device may refer to an apparatus or system such as a printer, scanner, fax machine, copy machine, etc., and/or a combination thereof (e.g., an MFD). Preferably, rendering device 140 is an MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying. Note that the rendering devices 142 and 144 illustrated herein with respect to FIG. 2 are generally analogous or similar to rendering device 140.

A non-limiting example of an MFD that can be utilized as rendering devices 140, 142 and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as rendering devices 140, 142 and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as rendering devices 140, 142 and/or 144 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The rendering device 140 includes a user interface 145, such as a panel menu. The panel menu may be used to select features and enter other data in the rendering device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the rendering device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and rendering device 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 2 illustrates a graphical representation of an output management system 200 associated with a network 135, in accordance with the disclosed embodiments. The output management system 200 generally includes the network 135 associated with one or more rendering devices 140, 142 and 144, data-processing system 110, enterprise rendering server 250 and a database 185. Data-processing system 110 depicted in FIG. 2 can be, for example, a server. Other devices such as, for example, desktops, network devices, palmtops, mobile phones, etc may also be included in the network infrastructure 135, as service providers. The rendering devices 140, 142 and 144 can be located remotely with respect to each other, or alternatively, they may be located locally with respect to each other.

The rendering device 140 can be an office machine which incorporates the functionality of multiple devices in one, so as to provide centralized document management, document distribution and production in a large-office setting and the like. The typical rendering device 140 can act as a combination of a printer, scanner, photocopier, fax and e-mail. While three rendering devices 140, 142 and 144 are shown by way of example, it is to be appreciated that any number of rendering devices can be linked to the network 135, such as two, four, six or more rendering devices. In general, the rendering devices 140, 142 and 144 can be employed to perform a rendering output function (e.g., printing, scanning, copying, faxing, etc) within a networked environment. Each MFD 140, 142 and 144 in the enterprise network 135 may collect its own data and store a persistent history associated with the data locally on the database 185 accessible by the rendering devices 140, 142 and 144. Note that rendering devices 140, 142 and 144 are generally analogous to one another.

The output management system 200 further includes a correlation module 245 that can be employed to correlate an attempted rendering job with an actual rendering job. Further, the correlation module 245 can visually represent an impact of print governance with respect to the enterprise network 135. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as USB drives, Flash drives, hard disk drives, CD ROMs, CD-Rs, DVDs, etc., and transmission media, such as digital and/or analog communication links. Examples of transmission media can also include devices such as modems, which permit information to be transmitted over standard telephone lines and/or the more advanced digital communications lines.

Figure 3:
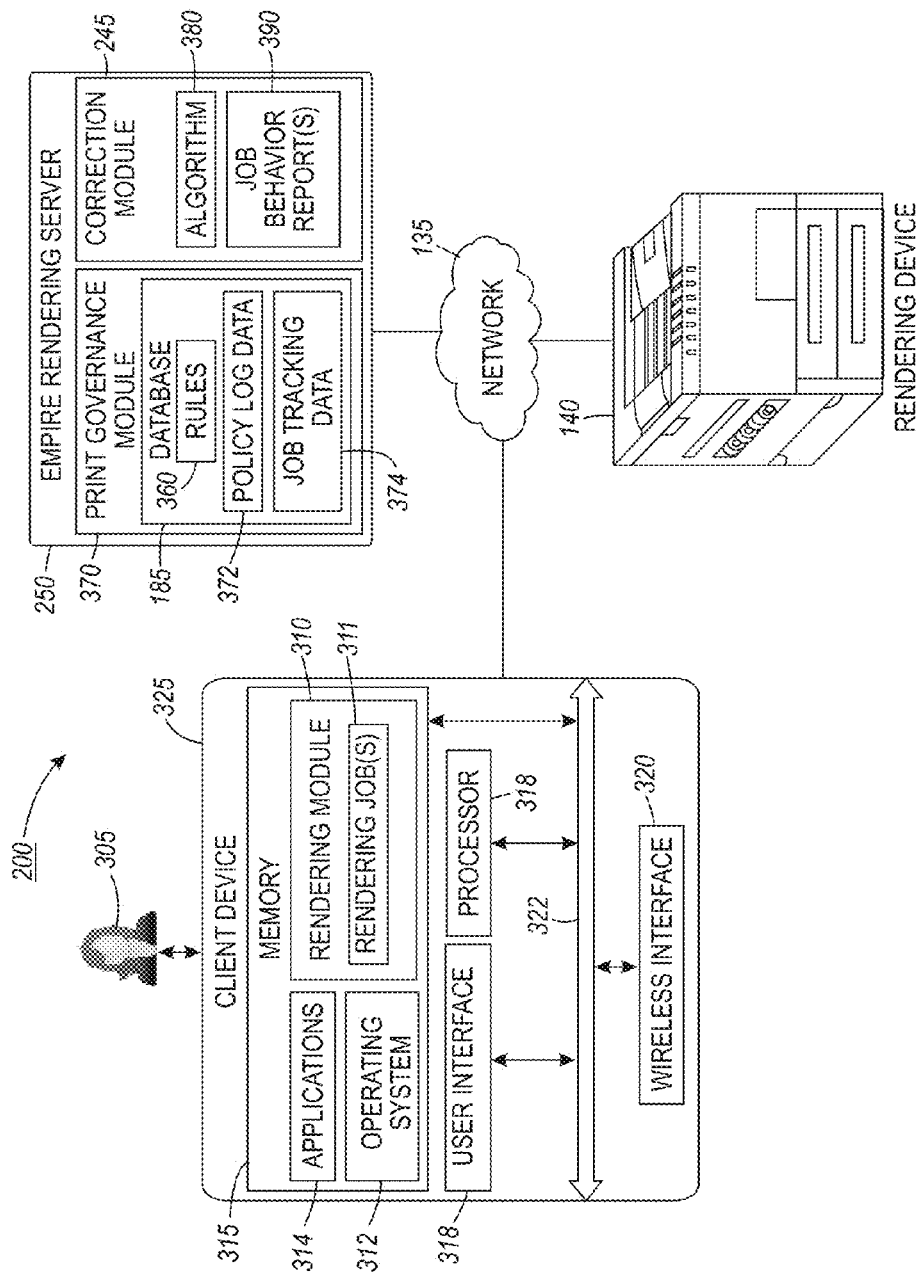
FIG. 3 illustrates a block diagram of the output management system, in accordance with the disclosed embodiments.

FIG. 3 illustrates a block diagram of the output management system 200, in accordance with the disclosed embodiments. Note that in FIGS. 1-7, identical or similar blocks are generally indicated by identical reference numerals. The output management system 200 can be utilized in various print governance applications in order to visually represent a print governance impact in the enterprise network 135. The output management system 200 includes the client device 325, the enterprise rendering server 250 and the rendering device 140 that are operatively communicated via the enterprise network 135. The client device 325 includes a memory 315, a user interface 316 and a processor 318 coupled to a local interface 322. The local interface 322 can be for example, a data bus with an accompanying control/address bus. A wireless interface 320 facilitates wireless communication with the rendering device 140, an enterprise rendering server 250 and other wireless devices via the enterprise network 135. The memory 315 stores several components that are executable by the processor 318. The components include, for example, an operating system 312, one or more applications 314, and the rendering module 310. The rendering module 310 can be utilized to submit the rendering job 311 to the enterprise rendering server 250 for rendering on the rendering device 140.

The enterprise rendering server 250 includes a print governance module 375 and a correlation computing module 245. The print governance module 375 can be configured with a set of rendering rules 360 in order to manage the rendering jobs 311 submitted from the client device 325. The print governance module 375 also includes a database 370 for storing a rendering policy log data 372 and a rendering job tracking data 374. Note that the rendering policy log data 372 includes the rendering jobs (e.g., attempted rendering jobs) that are rejected based on the rendering rules 360, depending upon design consideration. The rendering job tracking data 374 includes the rendering jobs (e.g., actual rendering jobs) submitted based on the rendering rules 360, depending upon design consideration. The correlation module 245 includes a correlation algorithm 380 for correlating the rendering policy log data 372 and the rendering job tracking data 374 in order to identify matched rendering jobs. The correlation module 245 also generates rendering job behavior report 390 based on the matched rendering jobs to visually indicate the impact of the print governance application 375 on the enterprise network 135.

Figure 4:
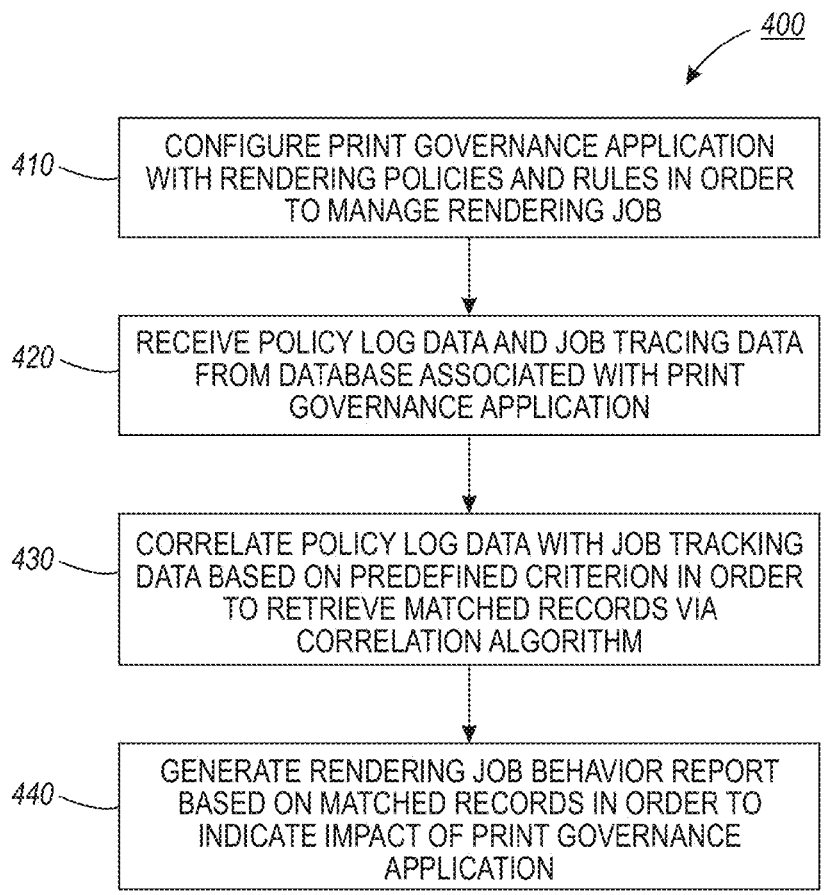
FIG. 4 illustrates a high level flow chart of operation illustrating logical operational steps of a method for correlating an attempted rendering job with an actual rendering job, in accordance with the disclosed embodiments.

FIG. 4 illustrates a high level flow chart of operation illustrating logical operational steps of a method 400 for correlating the attempted rendering job 372 with the actual rendering job 374, in accordance with the disclosed embodiments. The print governance application 375 can be configured with the rendering rules 360 in order to manage the rendering jobs 311 submitted from the client device 325, as illustrated at block 410. The policy log data 372 and the rendering job tracking data 374 can be retrieved from the database 185 associated with the print governance application 375, as depicted at block 420. The policy log data 372 and the job tracking data 374 can be correlated based on the predefined criterion in order to retrieve the matched records via the correlation algorithm 380, as indicated at block 430. The report can be generated based on the matched records in order to indicate the impact of the print governance application 375 on the rendering job behavior, as illustrated at block 440.

FIG. 5 illustrates a tabular view of a policy log data 500, in accordance with the disclosed embodiments. The policy log data 500 stored in the database 185 associated with the print governance module 375 includes the rejected rendering jobs based on the rendering rules 360. The policy log data 500 provides the information with respect to the rejected rendering jobs. A dotted region 510 indicates the rendering rules 360 with respect to the rejected rendering job. FIG. 6 illustrates a tabular view of a rendering job tracking data 600, in accordance with the disclosed embodiments. The rendering job tracking data 600 stored in the database 370 associated with the print governance module 375 includes the rendering jobs submitted and executed based on the rendering rules 360. The rendering job tracking data 600 provides the information with respect to each executed rendering job. The rendering job tracking data also indicates the rendering jobs that are modified and executed based on the rendering rules 360.

The rendering policy log data 500 and the rendering job tracking data 600 can be correlated to retrieve the matched rendering jobs and to indicate the jobs that are modified in accordance with the rendering rules 360. For example, a dotted region 520 indicates the rejected rendering job based on the rendering rule 'color printing' and a dotted region 610 indicates the similar rendering job that is modified and submitted as a black and white rendering document. Such correlation process can be executed based on the predefined criteria such as, for example, user name, and document name and job completion time. The matched rendering jobs can be then retrieved utilizing the correlation algorithm 380. The matched rendering jobs can be compared to indicate the cost of the attempted job versus cost of the rendered jobs, estimate savings due to print rules, resubmission of print jobs with modified parameters after being rejected, identify rules having greatest impact. The report 390 can be generated to illustrate the estimated cost avoidance due to rendering rules.

Figure 7:
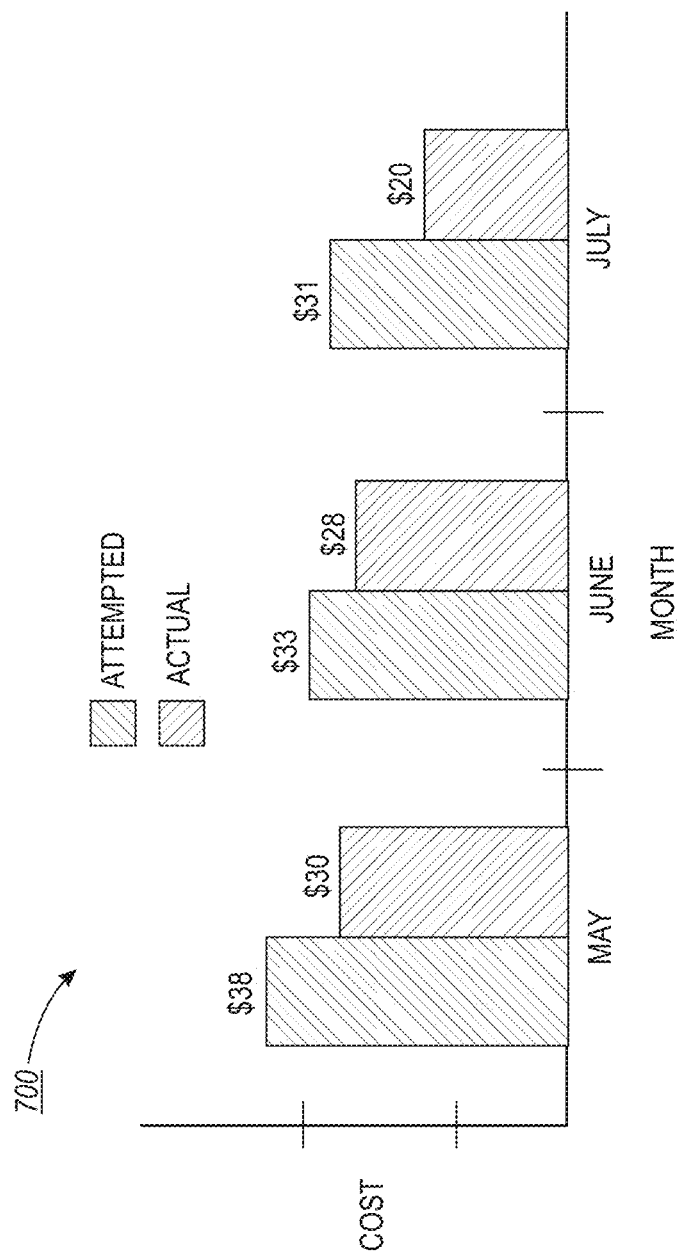
FIG. 7 illustrates a graph illustrating an estimated cost avoidance report, in accordance with the disclosed embodiments.

FIG. 7 illustrates a graph depicting an estimated cost avoidance report 700, in accordance with the disclosed embodiments. The estimated cost avoidance report 700 illustrates the cost savings due to the modified rendering jobs utilizing the bar graph. The cost avoidance report 700 illustrates the cost with respect to the attempted rendering jobs and the actual rendering jobs in order to depict the cost savings in each month. Over time, the attempted and the actual rendering jobs may decline, as the user rendering behavior becomes conditioned. For example, as the user starts rendering duplex or black and white documents by default, fewer rendering rules 360 may get triggered. Such system and method can automatically and efficiently indicate financial impact of print governance at the rule level. Such an approach can also be employed to condition the rendering services within the enterprise network.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
configuring a print governance application with a set of predefined rendering rules in order to thereafter retrieve a rendering policy log data and a rendering job tracking data with respect to a rendering job;
correlating said rendering policy log data and said rendering job tracking data based on a predefined criteria in order to retrieve a matched record utilizing a correlation algorithm; and
generating a report by analyzing said matched record in order to order to indicate an estimated cost reduction and to determine an impact of said print governance application within an enterprise environment.

2. The method of claim 1 further comprising comparing said matched record to estimate a financial impact with respect to said rendering rules.

3. The method of claim 1 further comprising configuring said policy log data to include at least one rejected rendering job based on said at least one rendering rule.

4. The method of claim 1 further comprising configuring said rendering job tracking data to include at least one actual rendering job based on said at least one rendering rule.

5. The method of claim 1 further comprising correlating said rendering policy log and said rendering job tracking data based on a date.

6. The method of claim 1 further comprising correlating said rendering policy log and said rendering job tracking data based on a user name.

7. The method of claim 1 further comprising correlating said rendering policy log and said rendering job tracking data based on a rendering job completion time.

8. The method of claim 1 further comprising correlating said rendering policy log data and said rendering job tracking data based on at least one of the following criterion:
a date;
a user name; and
a rendering job completion time.

9. A system, comprising:
a processor;
a data bus coupled to said processor; and
a computer-usable medium embodying computer code, said computer-usable medium being coupled to said data bus, said computer program code comprising instructions executable by said processor and configured for:
configuring a print governance application with a set of predefined rendering rules in order to thereafter retrieve a rendering policy log data and a rendering job tracking data with respect to a rendering job;
correlating said rendering policy log data and said rendering job tracking data based on a predefined criteria in order to retrieve a matched record utilizing a correlation algorithm; and
generating a report by analyzing said matched record in order to order to indicate an estimated cost reduction and to determine an impact of said print governance application within an enterprise environment.

10. The system of claim 9 wherein said instructions are further configured for comparing said matched record to estimate a financial impact with respect to said rendering rules.

11. The system of claim 9 wherein said instructions are further configured for modifying said policy log data to include at least one rejected rendering job based on said at least one rendering rule.

12. The system of claim 9 wherein said instructions are further configured for modifying said rendering job tracking data to include at least one actual rendering job based on said at least one rendering rule.

13. The system of claim 9 wherein said instructions are further configured for correlating said rendering policy log and said rendering job tracking data based on a date.

14. The system of claim 9 wherein said instructions are further configured for correlating said rendering policy log and said rendering job tracking data based on a user name.

15. The system of claim 9 wherein said instructions are further configured for correlating said rendering policy log and said rendering job tracking data based on a rendering job completion time.

16. The system of claim 9 wherein said instructions are further configured for correlating said rendering policy log data and said rendering job tracking data based on at least one of the following criterion:
- a date;
- a user name; and
- a rendering job completion time.

17. A system, comprising:
- a processor;
- a data bus coupled to said processor; and
- a computer-usable medium embodying computer code, said computer-usable medium being coupled to said data bus, said computer program code comprising instructions executable by said processor and configured for:
    - configuring a print governance application with a set of predefined rendering rules in order to thereafter retrieve a rendering policy log data and a rendering job tracking data with respect to a rendering job;
    - correlating said rendering policy log data and said rendering job tracking data based on a predefined criteria in order to retrieve a matched record utilizing a correlation algorithm; and
    - generating a report by analyzing said matched record in order to order to indicate an estimated cost reduction and to determine an impact of said print governance application within an enterprise environment; and
    - comparing said matched record to estimate a financial impact with respect to said rendering rules.

18. The system of claim 17 wherein said instructions are further configured for:
- modifying said policy log data to include at least one rejected rendering job based on said at least one rendering rule.

19. The system of claim 17 wherein said instructions are further configured for modifying said rendering job tracking data to include at least one actual rendering job based on said at least one rendering rule.

20. The system of claim 17 wherein said instructions are further configured for correlating said rendering policy log data and said rendering job tracking data based on at least one of the following criterion:
- a date;
- a user name; and
- a rendering job completion time.

* * * * *